United States Patent [19]
Owen et al.

[11] Patent Number: 5,080,190
[45] Date of Patent: Jan. 14, 1992

[54] REVERSIBLE RIGID COUPLING APPARATUS AND METHOD FOR BOREHOLE SEISMIC TRANSDUCERS

[75] Inventors: Thomas E. Owen; Jorge O. Parra, both of Helotes, Tex.

[73] Assignee: Southwest Research Institute, San Antonio, Tex.

[21] Appl. No.: 715,475

[22] Filed: Jun. 14, 1991

[51] Int. Cl.$^5$ .............................................. G01V 1/16
[52] U.S. Cl. .................................. 181/122; 181/401; 367/178; 367/188
[58] Field of Search ................... 181/122, 49; 367/57, 367/178, 188, 911, 912; 73/151, 152

[56] References Cited

U.S. PATENT DOCUMENTS

| | | | |
|---|---|---|---|
| 2,477,172 | 7/1949 | Brownlow | 367/188 |
| 3,963,093 | 6/1976 | Morris | 181/122 |
| 4,292,590 | 9/1981 | Wilson | 324/226 |
| 4,534,020 | 8/1985 | O'Brien | 367/401 |
| 4,879,695 | 11/1989 | Meadows | 181/102 |

FOREIGN PATENT DOCUMENTS 1260897 9/1986 U.S.S.R. .

*Primary Examiner*—Ian J. Lobo
*Attorney, Agent, or Firm*—Gunn, Lee & Miller

[57] ABSTRACT

An apparatus and method of high resolution reverse vertical seismic profile (VSP) measurements is shown. By encapsulating the seismic detector and heaters in a meltable substance (such as wax), the seismic detector can be removably secured in a borehole in a manner capable of measuring high resolution signals in the 100 to 1000 hertz range and higher. The meltable substance is selected to match the overall density of the detector package with the underground formation, yet still have relatively low melting point and rigid enough to transmit vibrations to accelerometers in the seismic detector. To minimize voids in the meltable substance upon solidification, the meltable substance is selected for minimum shrinkage, yet still having the other desirable characteristics. Heaters are arranged in the meltable substance in such a manner to allow the lowermost portion of the meltable substance to cool and solidify first. Solidification continues upwards from bottom-to-top until the top of the meltable substance is solidified and the seismic detector is ready for use. To remove, the heaters melt the meltable substance and the detector package is pulled from the borehole.

21 Claims, 5 Drawing Sheets

REVERSIBLE RIGID COUPLING APPARATUS AND METHOD FOR BOREHOLE SEISMIC TRANSDUCERS

This invention was made under United States Contract No. DE-AC 22-89C 14473 with the Department of Energy. The United States government has a non-exclusive, non-transferable, irrevocable paid up license to practice or have practiced for or on behalf of the United States this invention throughout the world.

BACKGROUND OF THE INVENTION

1. Field of the Invention

This invention relates to a method and apparatus for locating a seismic detector in a borehole so that high-resolution reverse vertical seismic profile (VSP) measurements can be obtained. The detector is a high resolution three-component sensor using accelerometers that operate in the frequency range of 100 to 1000 hertz. The accelerometers are embedded in a meltable substance such as wax. Heaters located in the meltable substance melt the wax. Upon solidification of the wax, the wax secures the seismic detector in a borehole. Thereafter, the seismic detector can be removed by the heaters again melting the wax and pulling on a line attached to the seismic detector to remove the seismic detector from the borehole.

2. Description of the Prior Art

High resolution reverse VSP (vertical seismic profile) measurements require that three-component vertical seismic signals be detected at or near the surface. Reverse VSP measurements are accomplished by having a source of seismic waves in the geological formations of interest. For example, a source of seismic signals may be located in a deep borehole (such as an oil well) with the seismic waves being radiated through the geological formations to seismic detectors deployed either on the surface or in shallow boreholes surrounding the deep borehole that contains the source of the seismic waves.

A source of seismic waves could include other apparatuses as invented by co-inventor Thomas Edwin Owen including (A) U.S. Pat. No. 4,651,311 entitled "Electrodeless Arc Discharge Acoustical Pulse Transducer" by Owen and Shroeder, (B) U.S. Pat. No. 4,706,227 entitled "Asymmetrical Lateral-Force Seismic Source Transducer" by Owen and Shroeder, (C) U.S. Pat. No. 4,525,645 entitled "Cylindrical Bender-Type Vibration Transducer" by Shirley and Owen, (D) pending U.S. patent application No. 07/698,800 by Owen entitled "Variable Multi-Stage Arc Discharge Acoustical Pulse Source Transducer."

The patents and applications indicated hereinabove are simply illustrative of different types of devices that can be used to generate a source of seismic waves. Other types of devices can be used, but the devices should be capable of generating frequencies in the range of 100 to 1000 hertz.

Conventional devices that generate seismic waves typically utilize small explosive devices in the source borehole to produce the seismic source signals (seismic waves). Vertical component geophones can be coupled by spikes into the ground surface around the source borehole. Utilizing this conventional method, the frequency range of the seismic signals generated and detected is approximately 10 to 100 hertz.

High resolution reverse VSP measurements employ a borehole seismic source device that is capable of generating seismic signals in the frequency range of approximately 100 to 1000 hertz or higher, which signal must be detected at the ground surface around the source borehole. The seismic source transducer may either be a pneumatically or hydraulically operated vibrator or mechanical impulse generator, an electric arc discharge pulse generator, or a piezoelectric device capable of generating controlled seismic wave forms radiated into the surrounding geological formations.

The seismic detector preferred for such high resolution reverse VSP measurements are acceleration sensors capable of responding accurately to the higher frequency seismic signals and capable of separately sensing the three dimensional (XYZ-axis) wave motions. These high resolution detectors are more expensive than the conventional geophones.

Effective high frequency seismic wave detection requires the sensors to be rigidly coupled to the formation in which the seismic waves propagate in order to prevent spurious responses and/or mechanical resonances caused by imperfect coupling between the sensor package and the borehole. The seismic detector package containing the acceleration sensors must be rigid and lightweight. Also, the average density of the entire detector package should be approximately the same as the average density of the geological formation to which the detector package is coupled.

The coupling method used in present-day borehole seismic detectors varies. In one embodiment, mechanical locking arms are actuated outward from the sensor probe housing to contact the borehole wall and forcibly lock the probe in place for the temporary time period required for the measurements. In general, seismic detectors that use wall-lock probes of this type have an average density which is much greater than the geological formations in which they are coupled. As a result, a very high mechanical coupling force is required to lock the sensor probes to the borehole wall. This technique is usually only partially successful in achieving the desired degree of coupling because of spurious mechanical resonances that occur in the clamping mechanism.

Alternatively, permanent installation of seismic detectors is occasionally desirable. A common practice used in such permanent installations is to embed the sensor in the borehole using Portland cement or other rigid casting material. In this case, the seismic detector package must be considered expendable because it cannot be recovered in a cost efficient manner. Permanent emplacements have been used in a number of field tests using relatively inexpensive geophones, which were abandoned when the tests were completed. This method of coupling is effective in providing good seismic couplings because the cement forms a rigid conformal casting in the borehole. Also, the overall density of the seismic detector and cement is reasonably well matched to that of the surrounding geological materials.

However, the acceleration sensors mentioned hereinabove for reverse VSP measurements are significantly more expensive than geophones and, therefore, cannot be considered to be expendable. The present invention pertains to a novel method of coupling seismic wave sensors in boreholes so as to achieve (A) the desirable results of rigid, conformal borehole coupling, (B) an approximate match between the average density of the sensor package and the geological formation and (C) the ability to recover the sensor package instead of abandoning it after the seismic measurements are complete. This was accomplished by having accelerometers embedded with heating coils in a meltable substance such as wax. By heating the wax through the heating coils, the wax will melt and conform to the borehole size when solidified. After use, the wax is again melted to allow removal of the entire sensor package.

In an effort to determine the closest prior art, a patentability search was performed and the following United States patents were discovered:
1. Meadows, "Method of Locating a Member in a Borehole," U.S. Pat. No. 4,879,695 issued on Nov. 7, 1989.
2. Brownlow, "Seismometer Case Cover," U.S. Pat. No. 2,477,172 issued on July 26, 1949.
3. O'Brown, "Apparatus and Method for Detecting Seismic Waves," U.S. Pat. No. 4,534,020 issued on Aug. 6, 1985.

However, the closest reference was Russian Patent No. 1,260,897 Al entitled "Device for Sealing Mouths of Uphill Boreholes During Logging," which shows the use of paraffin to seal a borehole that is filled with water. The objective in the Russian patent is to retain water for upwardly extending logging probes that require water as part of their coupling in the drilled formation. The paraffin wax is simply a plug feature at the entry collar of the borehole. Electrical heating elements may be used to soften the paraffin so the probe may be moved and relocated without disturbing the water tight plug. The Russian patent does not suggest the use of paraffin as a rigid coupling for the geophysical probe and, more generally, the water sealing function of an upwardly sloped borehole is not relevant to the subject invention.

SUMMARY OF THE INVENTION

It is an object of the present invention to provide a seismic detector for high resolution reverse vertical seismic profile (VSP) measurements.

It is another object of the present invention to provide a seismic detector that may be removably installed in boreholes, yet while installed being rigidly coupled to the formation.

It is yet another object of the present invention to provide an effective means of placing a seismic wave detector package in a shallow borehole so as to permit seismic wave measurements and later allowing the seismic wave detector package to be removed and used in other boreholes.

It is yet another object to provide the system for high resolution reverse VSP measurements utilizing seismic wave detector packages having three dimensional accelerometers therein which may be later used at other locations.

It is still another object of the present invention to provide a system and method for rigid coupling between a seismic wave detector package and the geological formation of a borehole, thereby eliminating spurious mechanical resonances that are caused by less than perfect coupling.

It is another object of the present invention to provide an apparatus and method for conformal embedment of a seismic wave detector package into the geological formation of a borehole to permit effective coupling in boreholes of irregular cross-section.

It is still another object of the present invention to provide an apparatus and method of coupling a seismic wave detector package to the geological formation in such a manner that the average density of the seismic wave detector package and coupling medium is reasonably well matched to the average density of the geological formation in which the seismic wave detector package is coupled.

It is even another object of the present invention to provide an apparatus and method of mounting a seismic wave detector package in a geological formation of a borehole wherein the coupling medium is a meltable substance that can be transformed from a solid state to a liquid state and vice versa so as to allow the sensor package first to be embedded in a borehole for coupling therewith and later decoupled and removed from the borehole.

These and other objects are accomplished by using a meltable substance (such as wax) as the coupling medium for the seismic wave detector package. A variety of waxes are available that have a useful range of physical properties that are appropriate for borehole coupling use. The properties of the wax that are of concern in borehole coupling use include melting point temperature, density, hardness, brittleness, surface characteristics and chemical compatibility. Waxes of natural origin (e.g. a vegetable ester composition) are used in bulk form in such chemical applications as investment casting where rigidity and precision dimensions are important. Blends of certain waxes have proved to be optimum to minimize thermal expansion that occurs on heating and the shrinkage that occurs on solidification. Waxes of this type have a specific gravity in the range of 0.97 to 1.05 and a melting point in the range of 180–190 degrees Fahrenheit. The shrinkage of such waxes on solidification and cooling vary widely from only a few percent up to 30 percent, depending upon their composition and blend.

An object of the present invention is to minimize the shrinkage by proper composition of the wax. The boreholes in which the wax is melted for coupling should not be filled with water.

It is also the objective to minimize problems with shrinkage during solidification by having the meltable substance solidify from the bottom to the top, which can be accomplished by vertical gradient cooling. Vertical gradient cooling is possible by a variety of heating elements located in various different vertical positions of the seismic detector package. For example, staged heat control can be applied in three vertically oriented zones along the sensor package, namely (1) the lower base zone, (2) central sensor zone, and (3) the upper wax supply and top tamping zone. By applying different heating power and heating application times to these zones, a vertical thermal gradient can be established in the melted wax column that surrounds the sensor package in the borehole. Then by further control of the wax cooling process, the wax can be solidified in a bottom to top sequence by which shrinkage in the two lower zones will tend to be minimized.

Heating of the wax is achieved by means of electrical heating elements contained within the borehole sensor package. The sensor package is prepared for installation in the borehole by encapsulating it within a cylindrical billet of wax whose diameter is smaller than the diameter of the borehole and whose length is such that enough wax is available to surround and embed the sensor package in the expected borehole diameter. By lowering the wax billet and the sensor package to the bottom of the borehole and then applying distributed electrical heating, uniform heating and melting of the wax can be achieved. After the wax has been melted and the lower and central zones are ready to solidify, heating power to those zones may be removed while maintaining appropriate heating to the upper zone so that gradient solidification is achieved from the base zone upward. If desired, temperature sensors can be located in each wax melt zone of the sensor package to monitor the thermal conditions and changes produced in the wax by the electrical heating power.

Upon cooling and solidification, the wax provides a rigid embedment of the seismic sensor package with the geological formation to provide a reliable couple therewith. In turn, the seismic sensor package can provide accurate sensor responses to seismic waves generated within the formation. When seismic measurements are completed, the electrical heating elements may be energized to melt the wax to allow the sensor package and heating element assembly to be removed, leaving only the residue wax in the borehole.

DESCRIPTION OF THE PREFERRED EMBODIMENT

Figure 1:
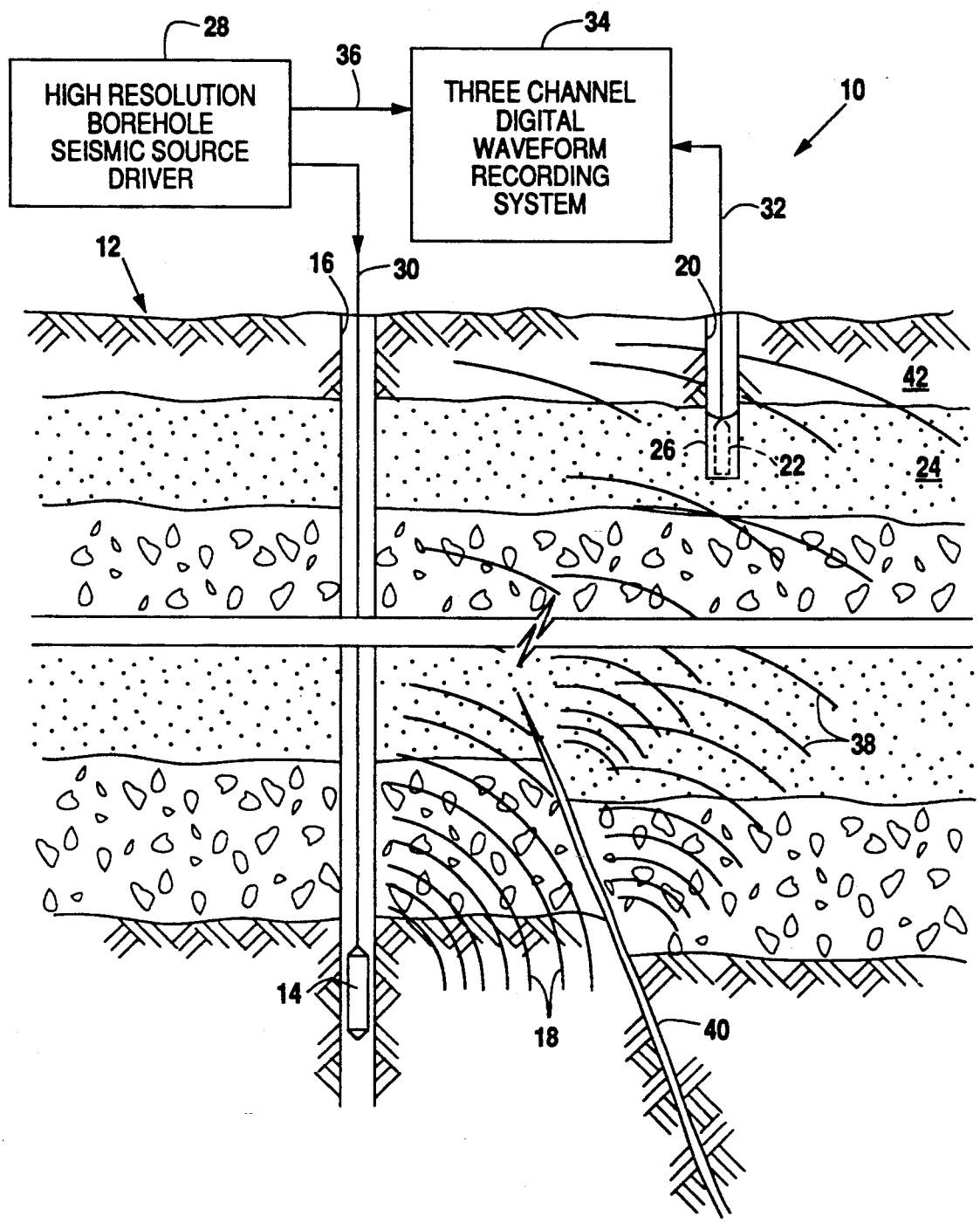
FIG. 1 is a pictorial elevational view of a reverse vertical seismic profiling measurement arrangement.

Referring to FIG. 1, there is pictorially illustrated a reverse vertical seismic profiling installation 10 in geological formation 12. A seismic source 14 is located in borehole or well 16. The seismic source 14 is capable of generating seismic waves between frequencies between 100 and 1000 hertz or higher. The seismic waves 18 radiate outwardly and upward in the manner as generally depicted in FIG. 1. It is envisioned that the seismic source 14 would be located some distance within the geological formation 12 such as in an oil well or similar type of well.

Located in a shallow borehole 20, but near the surface and in competent ground 24 is a seismic detector 22. The seismic detector 22 is rigidly connected to competent ground 24 by a meltable substance 26 such as a wax. The meltable substance 26 has been melted and solidified around the seismic detector 22 in shallow borehole 20.

Located at the surface is a high resolution borehole seismic source driver 28 that is electrically connected by cable 30 to the seismic source 14. Connected to the seismic detector 22 by cable 32 is a three channel digital waveform recording system 34. A synchronization connection 36 connects the high resolution borehole seismic source driver 28 with the three channel digital waveform recording system 34.

When the seismic source 14 generates seismic waves 18, the waves 18 propagate outwardly and upwardly toward the seismic detector 22. The seismic waves 18 will be changed to reflected and refracted waves 38 upon hitting fault 40. It is the difference between the original seismic waves 18 and the reflected and refracted waves 38 that indicate the location of the fault 40 in the geological formation 12.

Competent ground 24 as used hereinabove is a geologist's term that means solid or rigid ground. To get to solid ground, one must go below the weathered surface 42 where organic root penetrations and water seepage or drainage occur. Competent ground is below the loose ground nearest the surface.

The seismic source 14 could be an electric arc discharge pulse generator, a piezoelectric device capable of generating controlled seismic wave forms radiated into the surrounding geological formation, or a vibrator or mechanical impulse generator. A pneumatic air gun source from Bolt Technology, Inc. is commercially available that will generate frequencies up to about 600 hertz. For the present application, the seismic source 14 should generate seismic waves 18 that would range between 100 and 1000 hertz, possibly up to 2000 hertz.

Figure 2:
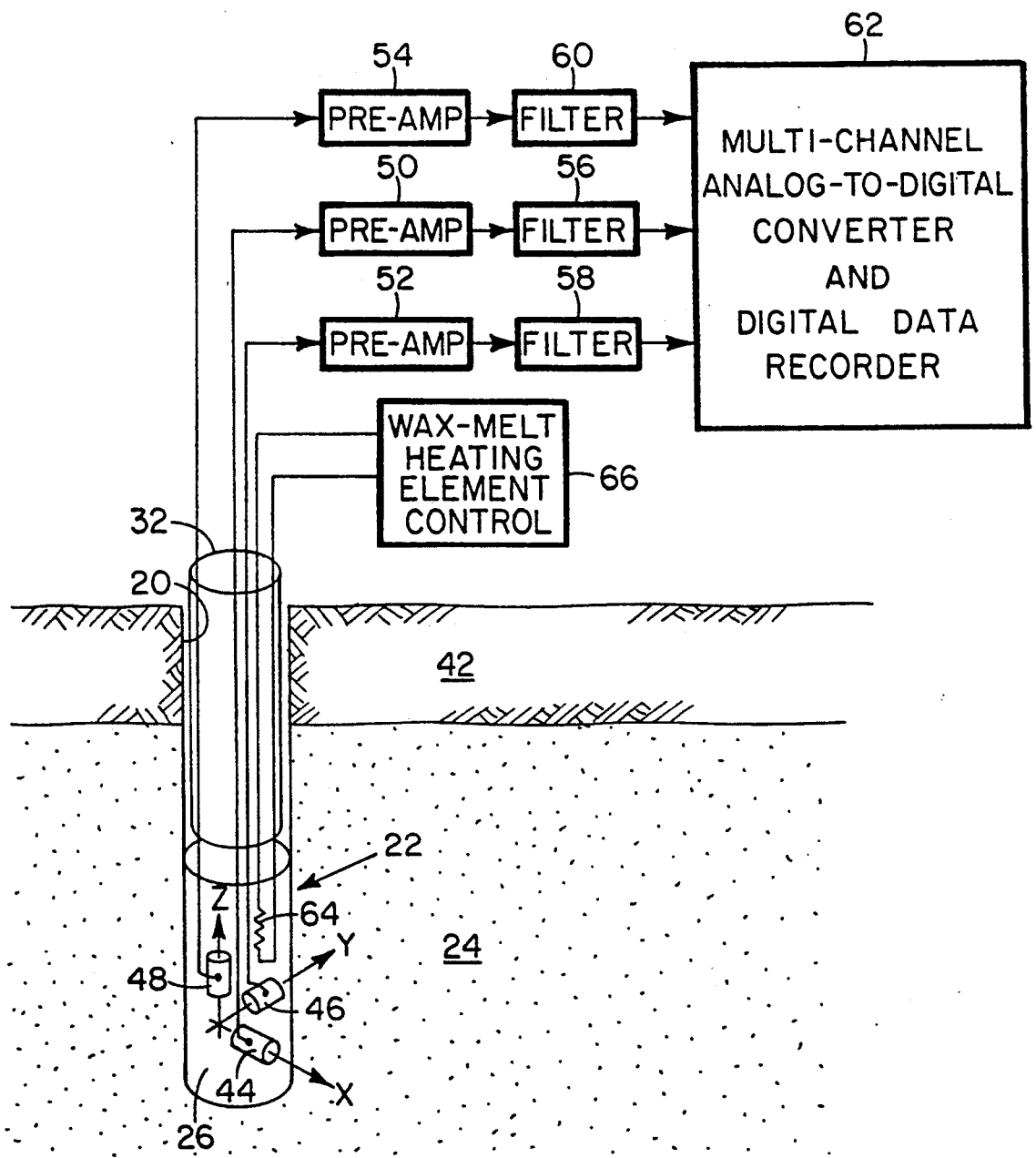
FIG. 2 is a pictorial elevational view of a seismic detector as installed in FIG. 1.

Referring to FIG. 2, a pictorial elevational view is shown illustrating further details concerning the seismic detector 22 as previously shown in connection with FIG. 1. The seismic detector 22 has X, Y and Z axis accelerometer sensors 44, 46 and 48, respectively. The sensors 44, 46 and 48 used by applicant were manufactured by Wilcoxon Research located in Rockville, Maryland. The accelerometer sensors 44, 46, and 48 were particularly designed for ranges between 100 to 1000 hertz and higher. The accelerometer sensors 44, 46 and 48 as used by applicant are high resolution devices that will tolerate the temperatures and the exposure when embedded in the ground, yet still have the desired seismic wave sensitivity.

The accelerometer sensors 44, 46 and 48 are contained within the meltable substance 26, which meltable substance 26 has solidified to form rigid coupling with the shallow borehole 20. The accelerometer sensors 44, 46 and 48 are connected through the cable 32 to pre-amplifiers 50, 52 and 54, respectively. After amplification, the signals are then filtered through filters 56, 58 and 60, respectively, prior to feeding into the multiple channel analog-to-digital converter and digital data recorder 62. In actual practice, the recorder 62 can be purchased with built-in pre-amplifiers and filters from EG&G Company as Model ES 2401 and called a portable seismograph. The capabilities of the portable seismograph are sufficient to provide all of the functions required for field operation.

Also embedded in the meltable substance 26 are heating elements 64. Heating elements 64 are controlled from the surface through wax melt heating element control 66. While not shown in FIG. 2, there can be a plurality of heating elements 64 that may be individually operated by the wax melt heating element control 66 which will create a heated gradient within the shallow borehole 20 during solidification.

Figure 3:
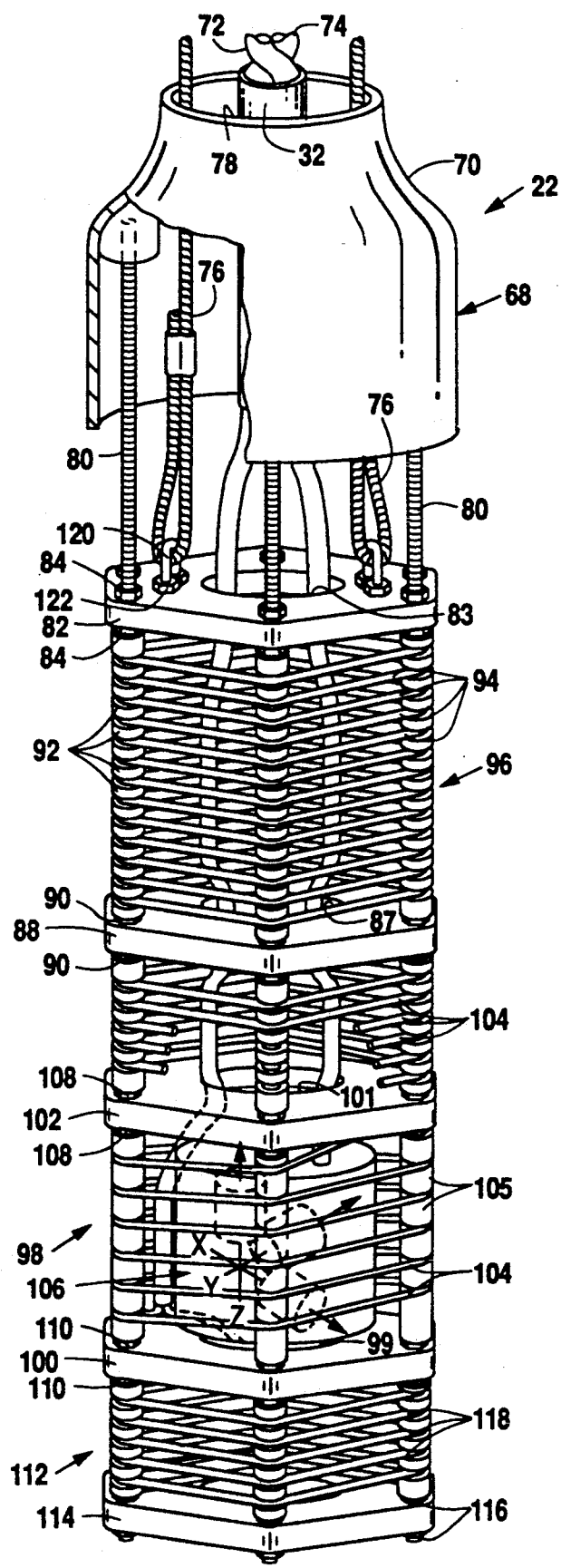
FIG. 3 is a perspective view of the seismic detector prior to encapsulating with portions of heater coils being cut away for illustration purposes.

Referring now to FIG. 3, a perspective view is shown of the seismic detector 22 prior to encapsulation in the meltable substance (wax) 26. The seismic detector 22 has a shroud 68 with a conical shaped portion 70 to aid in extraction of the seismic detector 22 from a borehole 22. Cable 32 that extends upwardly from the seismic detector 22 includes a heater cable 72 and accelerometer cable 74. Ropes 76 extend to the surface independent of the cable 32. The shroud 68 has a central opening 78 that allows for the passage of cable 32 and ropes 76 therethrough.

Connected to the inside of the shroud 68 are threaded rods 80 that extend downwardly therefrom. A few inches below the shroud 68 is located upper plate 82 that is held into position by nuts 84 on threaded rods 80. Upper plate 82 has an opening 83 therein to allow the heater cable 72 and accelerometer cable 74 to extend therethrough.

Below upper plate 82 are located electrically insulating cylindrical spacers 86 (shown in FIG. 4) around each of the threaded rods 80. The cylindrical spacers 86 extend down to upper section plate 88, which is held in position by nuts 90 on the threaded rods 80. Located on the electrically insulating cylindrical spacers 86 are insulation washers 92. Between each of the insulation washers 92 is wound heating coil wire 94. Heating coil wire 94 extends from immediately adjacent to upper plate 82 to immediately adjacent to upper section plate 88. Cylindrical spacers 86 and insulation washers 92 prevent electrical contact of the upper heating coil wire 94 with either rods 80 or plates 82 and 88.

What is referred to generally as the upper heating section 96 is located between upper plate 82 and upper section plate 88. A mid-heating section 98 is located between upper section plate 88 and lower section plate 100, which is held in position by nuts 110. Within the mid-heating section 98 is mid-plate 102, which is held in position by nuts 108. Between mid-plate 102 and upper section plate 88 are again located electrically insulated cylindrical spacers 86 and insulation washers 92 such as identified in connection with upper heating section 96. However, a separate mid-heating coil wire 104 is wrapped between the insulation washers.

Below the mid-plate 102 and above the lower section plate 100 is the accelerometer sensor package 106 that will be described in more detail subsequently. The accelerometer sensor package 106 is connected to accelerometer cable 74 by openings 83 in upper plate 82, opening 87 in upper section plate 88, and opening 101 in mid-plate 102. The acceleration sensor package 106 is rigidly connected to either or both mid-plate 102 and/or lower section plate 100.

While not shown in FIG. 3, electrically insulating cylindrical spacers 86 are also located around rods 80 between mid-plate 102 and lower section plate 100. The insulation washers 92 that have been used in other areas of the seismic detector 22 are replaced with larger spacers 105. The mid-heating coil wire 104 also extends through an opening 101 in mid-plate 102 and is wrapped around the accelerometer sensor package 106, but has approximately four times the spacing as the mid-heating coil wire 104 located thereabove. In other words, the mid-heating coil wire 104 extends from upper section plate 88 to lower section plate 100, but with four times the spacing below mid-plate 102. Care is taken so that the mid-heating coil wire 104 is not electrically connected to mid-plate 102, but simply extends therethrough.

Below lower section plate 100 is the lower heating section 112, which terminates with bottom plate 114 held in position by nuts 116. The lower heating section 112 again has electrically insulating cylindrical spacers and insulation washers (not separately numbered) around which the lower heating coil wire 118 is wound. The lower heating coil wire 118 is electrically insulated from bottom plate 112, lower section plate 100 and threaded rods 80. Lower heating coil wire 118 is connected to heater cable 72 through openings 83, 87, 101, and 99 in plates 100, 102, 88 and 82 located thereabove.

Ropes 76 are connected to eyelets 120 that are attached to upper plate 102 by nuts 122. The ropes 76 are used for raising or lowering the seismic detector 22 into a borehole. The ropes 76 prevent stress on heater cable 72 or accelerometer cable 74.

Figure 4:
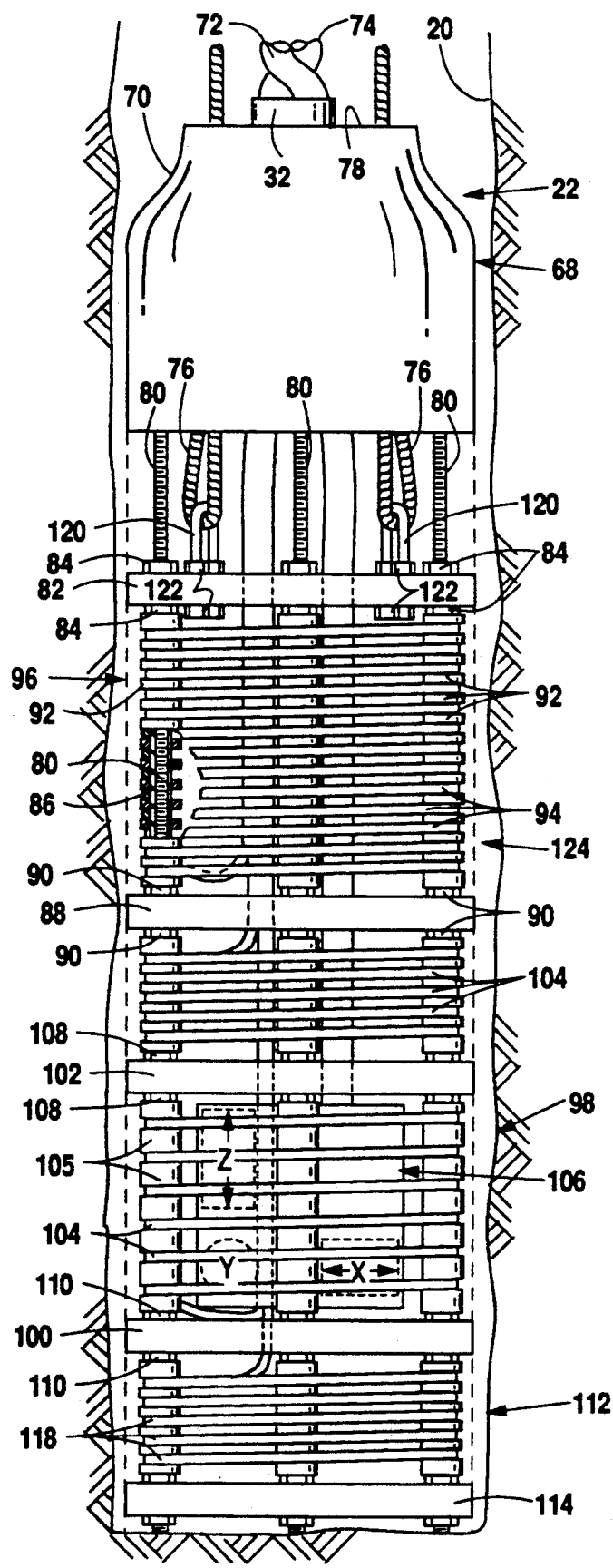
FIG. 4 is an elevated view of the seismic detector of FIG. 3 after encapsulation and positioned in a borehole, the encapsulating material being shown in broken lines.

Referring now to FIG. 4, the seismic detector 22, as previously described in conjunction with FIGS. 1-3, has been encapsulated in a meltable substance 124 (shown in broken lines) such as wax. In a typical embodiment, the borehole 20 (see FIG. 1 or 2) is approximately 6.25 inches in diameter. The diameter of the envelope of wax 124 would be about 5.6 inches and about 20.4 inches in height. This is to allow the seismic detector 22 to be lowered into borehole 20 and still have a small space for ease of raising and lowering the seismic detector 22. The object is for the wax 124 to fill the borehole 120 as completely as possible, yet still easily slide into the borehole 20.

After the seismic detector 22 is in position in borehole 20, the wax heating element control 66 energizes the heating element 64, which is composed of upper heating coil wire 94, mid-heating coil wire 104, and lower heating coil wire 118. Electrical energy applied to the heating element 64 will cause the wax 124 to melt. The melted wax 24 will then conform to the lower shape of the borehole 20. The objective is to still have enough wax 124 to cover the seismic detector 22 up to upper plate 82.

While one objective is to have a wax 124 with a minimum of shrinkage, if some shrinkage (or expansion) occurs upon solidification of the wax 124, shrinkage needs to be accommodated at the time of solidification to prevent voids or damage to the seismic detector 22. Therefore, to resolidify the wax 124, starting at the bottom and extending upward, current to lower heating coil wire 118 in lower heating section 112 is turned off first. It may be possible to simultaneously turn off the electric current to the mid-heating coil wire 104 in mid-heating section 98 if the heating difference between these windings has been sufficient to create a vertical thermal gradient. If a vertical thermal gradient has not been established, then a reduced heating current to mid-heater coil wire 104 should be maintained until the wax begins to solidify in the lower heating section 112. Thereafter, current to the mid-heating coil wire 104 is cut off and solidification occurs in the mid-heating section 98. Next, the current to upper heating coil wire 94 is cut off, allowing solidification of the upper heating section 96. Basically, solidification should occur from bottom-to-top whether it is by a series of different heaters located in different sections or differences in wrapping of coils either of which create a vertical thermal gradient. This tends to minimize (or eliminate) any void that could occur as a result of shrinkage.

Temperature sensors (thermistors or thermocouples) could be located in each heating section 96, 98 or 112 to monitor the thermal conditions and changes produced in the meltable substance 124 by the heating coil wires 94, 104 or 118. While the temperature sensors are not shown, they could accurately monitor the temperature to determine if there is a vertical thermal gradient.

Electric power is supplied by the wax heating control 66 to the heating coil wires 94, 104 and 118 which typically draws a maximum power of 1000 watts. The mid-heating coil wire 104 has additional turns, those spaced further apart, around the accelerometer sensor package 106. Typically, the heating coil wires 94, 104 and 118 are made from nichrome resistance wire, number sixteen gauge.

While many different types of meltable substances 124 can be used, wax has been found to be particularly suitable. However, waxes can come in almost endless varieties. Two types of waxes that have been found to be suitable are waxes of a vegetable origin and a hydrocarbon origin. For the present invention a carnauba wax has been used that is blended with small amounts of other vegetable waxes. A wax obtained from Bennett Products Company in Ashville, Pa., that had only a modest amount of shrinkage upon solidification has been used in the present invention. Vegetable waxes are used in many, many applications including industrial or food products. The waxes that would be used as the meltable substance 24 should have a melting point of around 190 degrees Fahrenheit, have a minimum of shrinkage, be very rigid upon seismic detector 22 that approximates the average density of the formation in which the seismic detector 22 is to be located. Of the various hydrocarbon waxes, paraffin is the most abundant and well known. Paraffin has a lower melting point of approximately 150 degrees Fahrenheit. There are organic waxes such as bees wax that are used in electrical applications. They are not very desirable because of a lack of rigidity. The wax that is used should be electrically non-conductive.

In certain applications, the wax can be filled with particulate matter such as sand which can modify its bulk characteristics. Sand, for example, would have low shrinkage properties, which is one of the primary problems to be overcome. Other types of particulate matter could be used to modify the bulk properties of the meltable substance 124.

Figure 5:
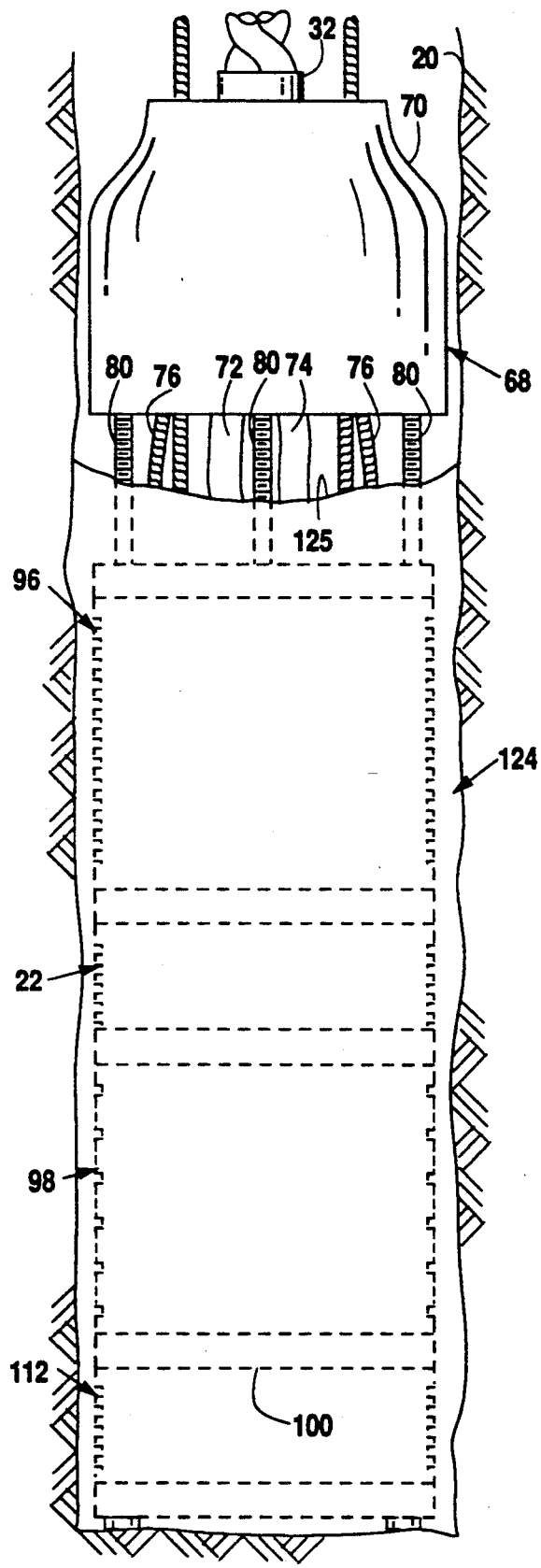
FIG. 5 is an elevated view of the seismic detector of FIG. 3 after melting and solidification of the encapsulating material within the borehole of FIG. 4.

FIG. 5 shows a typical example of how the meltable substance (wax) 124 fills the borehole 20 to embed the seismic detector 22 in position upon solidification. The concave portion 125 at the top shows a small amount of shrinkage in the wax 124.

Figure 6:
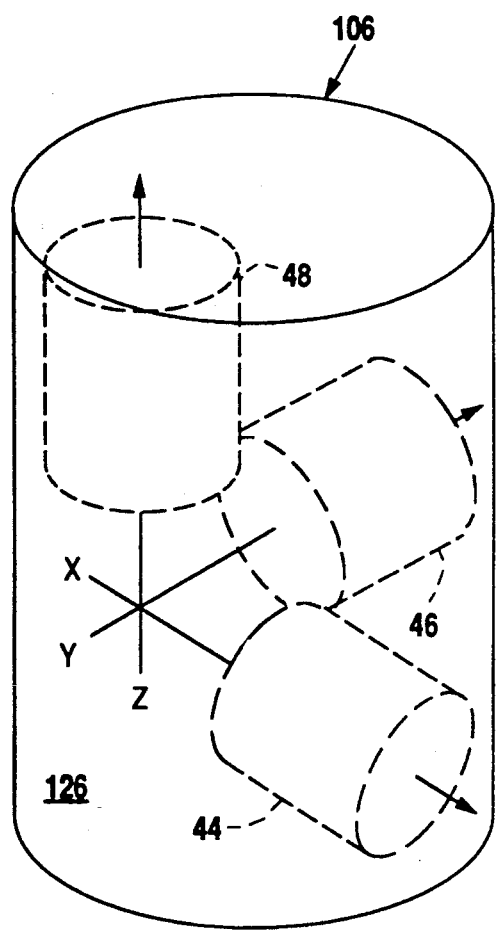
FIG. 6 is an enlarged perspective view illustrating the accelerometers of the seismic detector.

Referring now to FIG. 6, there is shown an enlarged perspective view of the accelerometer sensor package 106. Located within the accelerometer sensor package 106 are X accelerometer sensor 44, Y accelerometer sensor 46, and Z accelerometer sensor 48. The sensors 44, 46 and 48 are embedded in a polyurethane composition 126. The polyurethane 126 has a much higher melting temperature than the meltable substance 124. Therefore, the polyurethane 126 allows for connections between the accelerometer cable 74 (see FIGS. 3, 4, and 5) and sensors 44, 46 and 48. Also, the polyurethane protects the sensors 44, 46 and 48 by encapsulating them as a hermetically sealed unit. This keeps out impurities that could affect the operation of the accelerometers.

By using the invention as described hereinabove, including a meltable substance 124 that embeds the seismic detector 22 in the formation being evaluated, a much more accurate signal can be obtained. The more accurate the signal, the higher the resolution and the easier it is to detect cracks or fractures in the geological formation. The increased resolution allows higher frequencies to be used, which also means cracks and fractures can be more accurately pinpointed in the formation of interest.

We claim:

1. A method of detecting seismic waves in a geological formation to give a high-resolution reverse vertical seismic profile with a reusable seismic detector comprising the following steps:

locating a seismic source in said geological formation;

placing at least one seismic detector in a hole in competent ground near said seismic source, but toward a surface of said geological formation;

connecting said seismic source and said seismic detector to a seismograph at said surface;

applying heat to a meltable substance in which said seismic detector is encapsulated to liquify said meltable substance, said meltable substance conforming to said hole upon liquefaction;

removing heat from said meltable substance to allow cooling and solidification of said meltable substance in a manner to conform said meltable substance with said hole and embed said seismic detector therein;

performing seismic measurements with said seismic source, said seismic detector and said seismograph;

re-applying heat to said meltable substance to cause a second liquefaction thereof after said seismic measurements are complete; and removing said seismic detector from said hole.

2. The method as recited in claim 1 includes a step of substantially encapsulating said seismic detector in a meltable substance prior to said placing step.

3. The method as recited in claim 2 includes a step of selecting a meltable substance prior to said encapsulating step, said meltable substance (a) giving an overall density to seismic detector approximately equal to said competent ground, (b) having a melting point approaching 200 degrees Fahrenheit, (c) forming a rigid bond upon said solidification and (c) having a minimum shrinkage factor upon solidification.

4. The method as recited in claim 3 wherein said selection step includes using a wax as said meltable substance, said wax being formed from a blend to yield necessary characteristics.

5. The method as recited in claim 1 wherein said applying step includes a plurality of heaters vertically arranged in said seismic detector, said heaters creating a vertical thermal gradient upon said liquefaction of said meltable substance.

6. The method as recited in claim 5 wherein said removing step includes turning off said heaters from bottom-to-top in a sequential manner so that said meltable substance will solidify from bottom to top thereby preventing voids in said meltable substance upon said solidification.

7. The method as recited in claim 2 wherein the preceding steps are repeated with said seismic detector being reusable at another location.

8. A seismic detector for high resolution reverse vertical seismic profile measurements when placed in a shallow borehole in a geological formation of interest that contains a seismic source and connected to a seismograph, said seismic detector comprising:

a framework;

accelerometer sensors for X, Y and Z axis, said accelerometer sensors being rigidly mounted on said framework;

means for electrically connecting said accelerometers to said seismograph to record seismic waves received by said accelerometer sensors from said seismic source;

heating elements secured to, but electrically insulated from, said framework;

power means for supplying power to said heating elements; and meltable substance encapsulating said seismic detector, said meltable substance liquefying upon heat being applied by said heating elements and solidifying upon removing said heat to embed said seismic detector in said shallow borehole.

9. The seismic detector as given in claim 8 wherein said accelerometer sensors are high resolution sensors operating at frequencies between 100 to 1000 hertz.

10. The seismic detectors as given in claim 9 wherein said accelerometer sensors are contained in a sealed sensor package that prevents interference with proper operation of said accelerometer sensors, said sealed sensor package being attached to said framework.

11. The seismic detector as given in claim 8 wherein said heating elements are vertically arranged and independently operated to give a vertical thermal gradient prior to said solidification.

12. The seismic detector as given in claim 11 wherein said heating elements are formed from a plurality of resistance heating coils in said vertical arrangement, variations in wrapping of said resistance heating coils causing said vertical thermal gradient.

13. The seismic detector as given in claim 12 wherein power means is switched off of said plurality of said resistance heating coils in a bottom-to-top manner so that said solidification is in a bottom-to-top manner to reduce shrinkage and eliminate voids in said meltable substance.

14. The seismic detector as given in claim 8 wherein said meltable substance is a wax.

15. The seismic detector as given in claim 14 wherein said wax has a melting point above normal operating temperatures, but below 200 degrees Fahrenheit, said wax giving said seismic detector an average density near the density of said geological formation.

16. The seismic detector as given in claim 14 wherein said wax embeds said seismic detector in said shallow borehole upon solidification, said wax being rigid enough to couple said seismic waves to said accelerometer sensors.

17. The seismic detector as given in claim 8 includes pulling means attached to said framework for removing said seismic detector from said borehole after use and upon re-liquefying of said meltable substance.

18. A high resolution reverse vertical seismic profiling system for performing seismic measurements on a geological formation of interest comprising:
 a seismic source located in said geological formation;
 at least one seismic detector located in a hole in competent ground near said seismic source;
 seismograph being connected to said seismic source and said seismic detector;
 heating means contiguous with said seismic detector;
 power means for supplying power to said heating means, seismograph, seismic source and said seismic detector;
 a meltable substance having a melting point between 150 degrees Fahrenheit and 200 degrees Fahrenheit, said meltable substance encapsulating said seismic detector and said heating means therein;
 upon placement of said encapsulated seismic detector and said heating means in said hole, said power means applying power to said heating means to melt said meltable substance; thereafter said power being removed to allow solidification of said meltable substance to embed said seismic detector and said heating means in said hole.

19. The high resolution reverse vertical seismic profiling system as given in claim 18 wherein said meltable substance may be melted a second time to allow removal and reuse of said seismic detector leaving only said meltable substance in said hole.

20. The high resolution reverse vertical seismic profiling system as given in claim 19 wherein said meltable substance is selected to (a) to give an overall density to said seismic detector approximately equal to said competent ground, (b) form a rigid bond upon said solidification, and (c) having a minimum shrinkage factor upon solidification.

21. The high resolution reverse vertical seismic profiling system of claim 20 wherein said heating means are resistance heating coils arranged to give a vertical thermal gradient during said solidification to insure a bottom-to-top sequence of said solidification.

* * * * *